S. JOSSELYN.

FOUNTAIN PEN.

APPLICATION FILED JULY 18, 1917.

Reissued Nov. 27 1917.

14,397.

INVENTOR:
Stormont Josselyn

By Coale & Stayman
HIS ATTORNEYS:

UNITED STATES PATENT OFFICE.

STORMONT JOSSELYN, OF ATLANTIC, MASSACHUSETTS, ASSIGNOR OF ONE-HALF TO S. CHILTON CROCKER, OF BOSTON, MASSACHUSETTS.

FOUNTAIN-PEN.

14,397. Specification of Reissued Letters Patent. Reissued Nov. 27, 1917.

Original No. 1,214,310, dated January 30, 1917, Serial No. 120,607, filed September 18, 1916. Application for reissue filed July 18, 1917. Serial No. 181,224.

*To all whom it may concern:*

Be it known that I, STORMONT JOSSELYN, a citizen of the United States, residing at Atlantic, in the county of Norfolk, in the State of Massachusetts, have invented a new and useful Improvement in Fountain-Pens, of which the following is a specification.

This invention relates to that class of fountain pens in which an expansible rubber sack is provided within the barrel, and mechanical means is provided in connection therewith for collapsing the same; and, more particularly, to that particular type of fountain pen in which a presser plate is arranged to engage the sack throughout substantially its entire length, and a lever is pivotally connected to the pen barrel in position to press the plate against the sack, to collapse the same, so that when the sack is permitted to expand, it will be filled with the liquid in which the pen section has been dipped.

Prior to my invention, various devices of the above-described character have been produced, but said devices have, so far as I am aware, been open to certain objections, some of the more important of which have been difficulty in operation, unreliability of the locking means for the operating lever, unsightly or inconvenient projections, and excessive cost of manufacture.

The objects of my invention are to provide a fountain pen, of the character above referred to, in which the lever-operating means is arranged to permit easy and convenient compression of the sack, and in which a convenient and effective means for locking said operating means is provided. Further, to provide a construction and arrangement which will enable the production of a fountain pen which has a smooth, continuous surface throughout the length of the pen barrel, so that it will have substantially the same appearance as an ordinary fountain pen, unprovided with mechanical means for collapsing the sack, and which is of simple and durable construction, so that it is unlikely to get out of order, and may be manufactured at a reasonable cost. I accomplish these objects by the means shown in the accompanying drawing, in which—

Figure 1:
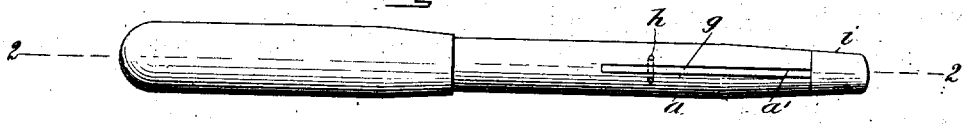
Figure 1 is a side elevation of a fountain pen embodying my invention.
Figure 2:
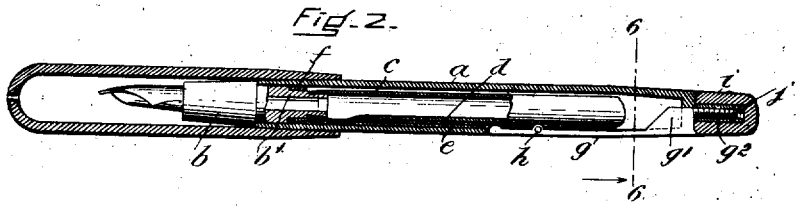
Figs. 2 and 3 are central longitudinal sectional views thereof, showing the operating parts in different positions.

As shown in the drawing, the barrel $a$ has the usual pen section $b$ mounted therein, and a rubber sack $c$ is provided, which is arranged in the barrel, and connected to a reduced portion on the inner end of the pen section.

A presser plate $d$ is arranged to extend longitudinally of the rubber sack, throughout substantially the entire length thereof, said presser plate being connected to a spring arm $e$, which is, in turn, connected to a metal split collar $f$, the latter being arranged to grasp a reduced portion $b'$, on the inner end of the pen section. The pen barrel $a$ is further provided with a straight, narrow slot $a'$, which extends longitudinally thereof from a point adjacent the middle, to the end of the barrel, and partly across the end wall thereof, and an operating lever $g$ is mounted to swing in said slot $a'$, about a pivot $h$, located in the barrel intermediate the lever, and in such a position that the exterior surface of the lever is flush with the surface of the pen barrel, when the lever is in its normal or inoperative position.

The operating lever is arranged to provide a presser plate engaging arm and an operating arm. The operating arm is provided with an inwardly-extending offset portion $g'$ and is thence extended beyond the end of the barrel by a tip portion $g^2$ preferably in central alinement with the barrel when the lever is in its normal or inoperative position. For maintaining the lever in its normal, inoperative or disengaging position with relation to the presser bar and for otherwise assisting in the manual control of the lever, the barrel is provided with an end piece or cap $i$ which is retained to have a releasable engagement with the barrel. This end piece or cap is preferably made of hard rubber the same as the barrel, and forms practically a continuation thereof or finished end to the barrel. The retention of the end piece or cap $g'$ to have engagement with the barrel for maintaining the lever in its normal or disengaged position, is preferably obtained as shown, by externally threading the extending tip portion $g^2$ of the lever and internally threading the end piece or cap $i$, or rather a bushing $j$ within the cap, to screw onto the end of the lever until it bears against the end wall of the barrel in the manner of a nut, and in which connection, for this particular mode of retention, the end piece or cap might be termed a nut. To prevent lateral displacement of the end piece when in engagement with the end of the barrel, the end of the barrel is slightly cupped or recessed, and the adjacent end of the end piece is correspondingly formed to enter the same, so that the end piece may be loosened or unscrewed to an appreciable extent before the lever can be drawn out of its normal position.

Figure 3:
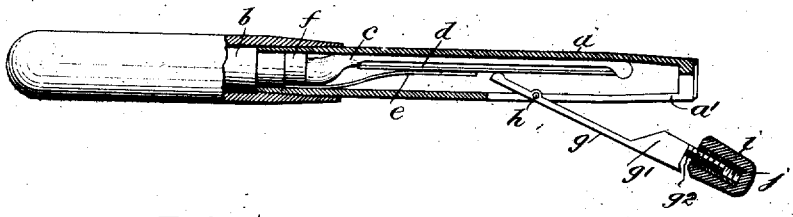
Figure 4:
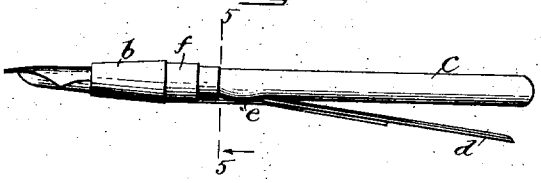
Fig. 4 is a detail view of the presser plate and its supporting means.
Figure 5:
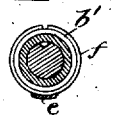
Fig. 5 is a cross-sectional view, on an enlarged scale, taken at the line 5—5 of Fig. 4.
Figure 6:
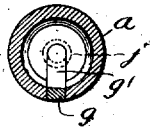
Fig. 6 is a similar view, taken at the line 6—6, Fig. 2.

To fill the pen, the nut $i$ is unscrewed to the necessary extent, and the lever $g$ is swung outwardly, to cause its short arm to force in the presser plate, and collapse the sack, as shown in Fig. 3, so that, when the lever is swung back to its normal position, the expansive force of the sack will cause the ink to be drawn therein in the usual manner. The nut $i$ will then be screwed against the end of the barrel again, to lock the lever in its normal position. During the operation of the lever, the nut $i$ provides a convenient handle, or means for grasping it with the fingers.

Figure 7:
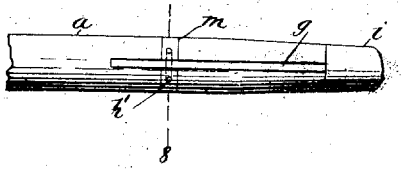
Fig. 7 is a plan view, showing a slightly modified form of my invention.
Figure 8:
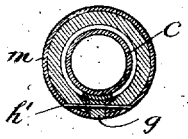
Fig. 8 is an enlarged sectional view, taken at the line 8—8, Fig. 7.

Figs. 7 and 8 show a slightly modified form of my invention, in which, instead of arranging the pivot $h'$ directly on the hard rubber of the barrel, a metal band $m$ is provided to receive the same, which is arranged about the pen barrel, flush with the surface thereof, said band being also made to serve for ornamental purposes, if desired.

Having thus fully described my invention, I claim and desire to secure by Letters Patent of the United States:—

1. In combination with the barrel of a fountain pen having a collapsible sack therein, a presser plate arranged to engage said sack, a lever pivotally mounted in said barrel and arranged to engage said plate to collapse the sack when swung from its normal position, and a nut threaded on the end of said lever and arranged to be screwed into locking engagement with the end of the barrel, to lock the lever in inoperative position.

2. In combination with a fountain pen barrel having a longitudinal slot extending continuously from an intermediate point in its side wall into the end wall thereof, a lever pivotally mounted in said slot and having one arm thereof provided with an offset portion, arranged to extend into the slotted portion of said end wall, and a threaded extension, projecting beyond said end wall of the barrel, a nut threaded on said extension and adapted to be screwed against said end wall, to lock said lever in inoperative position, and a collapsible sack in the barrel having a presser plate arranged to be engaged by the opposite arm of said lever.

3. In combination with a fountain pen barrel having a slot in its wall extending longitudinally thereof from its closed end, a lever pivotally connected to the barrel to swing in said slot, and, in the normal position thereof, to lie with its outer surface flush with the surface of the barrel, one arm of said lever having a threaded end portion extending beyond the end of the barrel in central alinement therewith, when the lever is in said normal position, a nut threaded on said end portion, adapted to be clamped against the end of the barrel, to lock said lever in said position, and constructed to provide a continuous surface with the adjacent portion of the barrel, and a collapsible sack in the barrel having a presser plate arranged to be engaged by the opposite arm of the lever.

4. A fountain pen having a barrel, a collapsible sack therein, a presser plate disposed within the barrel and arranged to collapse said sack when actuated, a lever pivotally supported whereby it may actuate said presser plate when the lever is turned, said lever having an operating arm displaceable laterally from said barrel when the lever is turned, an end piece to said barrel carried by said operating arm of the lever and movable therewith, and means whereby said end piece may be retained in releasable engagement with said barrel when said lever is occupying a disengaging position.

5. A fountain pen having a barrel, a collapsible sack therein, a presser plate disposed within the barrel and arranged to collapse said sack when actuated, a lever pivotally supported whereby it may actuate said presser plate when the lever is turned, said lever having an operating arm displaceable laterally from said barrel as the lever is turned, an end piece to said barrel carried by said operating arm of the lever and movable therewith, the same providing a thumb piece for turning said lever, and means whereby said end piece may be retained in releasable engagement with said barrel in extension thereof when said lever is occupying a disengaging position for maintaining said lever in such position.

6. A fountain pen having a barrel, a collapsible sack therein, a presser plate disposed within the barrel and arranged to collapse said sack when actuated, a lever pivotally supported whereby it may actuate said presser plate when the lever is turned, said lever having an operating arm extending beyond the end of said barrel and displaceable laterally from said barrel as the lever is turned, an end piece to said barrel mounted upon the operating arm of the lever and movable therewith, the same comprising a thumb piece by which said lever may be manually controlled, and means whereby said end piece may be releasably retained in engagement with said barrel in extension thereof and for holding said lever in a disengaging position.

7. In a fountain pen, a barrel having a slot therein extending inwardly from the outer end of the barrel and a collapsible sack within the barrel, a presser plate likewise disposed within the barrel and arranged to collapse said sack when actuated, a lever pivotally supported whereby it may actuate said presser plate as the lever is turned, said lever having an operating arm extending within said slot in the barrel and beyond the outer end of the barrel when said lever is occupying its disengaging position with relation to said presser plate and which operating arm is displaceable laterally from said barrel as the lever is turned for actuating said presser plate, an end piece to said barrel carried by said operating arm of the lever and movable therewith, the same providing a thumb piece for turning said lever, and a retaining means for holding said end piece in releasable engagement with said barrel when said lever is occupying a disengaging position for maintaining said lever in such position, said retaining means permitting of the release of said end piece from said barrel whereby the end piece may then operate as a thumb piece for turning said lever as aforesaid.

STORMONT JOSSELYN.